Patented Dec. 30, 1952

2,623,830

UNITED STATES PATENT OFFICE 2,623,830

PIPE JOINT SEALING COMPOUND

Lester Aronberg, Chicago, Ill.

No Drawing. Application May 3, 1948,
Serial No. 24,921

10 Claims. (Cl. 106—245)

My invention relates to pipe joint sealing compounds and is particularly concerned with the production of such compounds in a form which is simple to use and which possess marked advantages over known products used for this purpose. This application is in part a continuation of my copending allowed application, S. N. 613,011, filed August 27, 1945, now abandoned.

It has heretofore been common to utilize liquid or pasty pipe joint sealing compounds, the same being applied to the pipe threads by means of a brush or by extrusion through a tube. Such liquid or pasty compositions are messy to handle, are wasteful in use, and possess other objectionable characteristics with which those versed in the art are familiar. Other known pipe joint sealing compounds contain lead or other injurious ingredients and, apart from other objections thereto, such compounds are not desirable because of the health hazards which they introduce. While it has also been proposed to produce pipe sealing compounds in the form of solid products, such compounds are unsatisfactory in that they lack softness when applied to the pipe threads and thus require too long a period of time to cover the thread area. Moreover, they are, in general, greasy and are difficult or messy to handle.

In accordance with my invention, the various objectionable features which have heretofore characterized pipe sealing compounds are overcome. The pipe sealing compounds of my present invention are solid at ordinary or room temperatures and at summer temperatures and, therefore, they may be readily fabricated and maintained in the form of a stick or pencil, thereby greatly facilitating the use thereof. Waste is prevented since substantially the exact amount of compound needed to insure perfect sealing may be applied in a simple manner, it being necessary only to rub the sealing compound across the pipe threads in three or four places around the circumference or periphery thereof whereupon the compound spreads and fills the threads when the pipe ends are turned in the unions, elbows or the like.

The pipe joint sealing compounds produced in accordance with my invention are, moreover, characterized by lack of greasiness or oiliness. Under normal conditions, the pipe sealing compounds, for example, in the form of sticks or pencils, have a dry, thin surface film or skin resulting from oxidation of the surface by contact with the air. This film forms a barricade or skin or layer impervious or substantially impervious to the passage of air or other gases therethrough and renders the exterior surface dry so that handling of the same is simple and convenient with no attendant messiness. When the stick is used, it is rubbed against the pipe threads and the thin surface skin is thereby readily removed by the resulting abrasion so that the under surface or interior or body of the compound may be spread on the pipe threads in the manner previously pointed out. When the stick is not in use, the previously exposed portion of the compound again forms a skin, after a period of time, due to the contact with the air and insures again that the exposed surface is dry to the touch.

The pipe joint compounds produced in accordance with my present invention may be used for all types of metal and plastic threads. Their use assures tight joints which are unaffected by air, water, steam, acid, gas, brine and the like. The pipe thread joints, nuts, bolts, gaskets, turnbuckles and the like are thoroughly lubricated and sealed and the thread life is greatly increased. Rusting is prevented and the joints may be easily taken apart even after months or years. The compounds contract or expand as the case may be with the pipes and have the property of withstanding vibration, deflection and pressure. The pipe sealing compounds prepared in accordance with my invention are always ready for immediate use and are free from objectionable drying out characteristics.

In general, the pipe joint sealing compounds of my present invention utilize a mixture of a waxy material having a melting point of at least about 140 degrees F. and ranging up to about 200 degrees F., an air-oxidizable film-forming material in the form of an aliphatic carboxylic acid containing at least 12, and preferably 18, carbon atoms, and at least two double bonds, or derivatives of such acids, and a filler. These ingredients are combined in certain proportions, as hereafter pointed out, to produce a solid mass at ordinary room temperatures. In addition to the primary ingredients referred to above, certain supplemental agents may be utilized as, for example, drying accelerators, and oxidation retarding agents.

In order that those skilled in the art may more fully understand the nature of my present invention, the following examples are set forth as exemplifications of pipe sealing compounds falling within the scope of my invention. It will be appreciated that these examples are only illustrative and are in nowise limitative of the full scope of my invention.

Numerals in the right-hand column indicate parts by weight.

*Example 1*

| | |
|---|---|
| Paraffin wax (M. P. 139–141° F.) | 20 |
| Linseed oil | 25 |
| Titanium dioxide-calcium sulfate mixture containing about 30% titanium dioxide | 45 |

*Example 2*

| | |
|---|---|
| Paraffin wax (M. P. 150–152° F.) | 20 |
| Perilla oil | 30 |
| Titanium dioxide-barium sulfate mixture containing about 30% titanium dioxide | 55 |

*Example 3*

| | |
|---|---|
| Paraffin wax (M. P. 149–151° F.) | 20 |
| Linseed oil | 25 |
| Talc | 45 |
| Beef tallow | 4 |
| Cobalt acetate | .05 |

*Example 4*

| | |
|---|---|
| Hydrogenated cottonseed oil (M. P. 140° F.) | 20 |
| Oiticica oil | 24 |
| Diatomaceous earth | 40 |
| Manganese acetate | .04 |

*Example 5*

| | |
|---|---|
| Triple pressed stearic acid (mixture of stearic and palmitic acids) | 20 |
| Soya bean oil | 25 |
| Graphite | 45 |

*Example 6*

| | |
|---|---|
| Mineral wax (M. P. 170–175° F.) | 10 |
| Linseed oil | 20 |
| Titanium dioxide | 40 |

*Example 7*

| | |
|---|---|
| Mineral wax (M. P. 170–175° F.) | 10 |
| Linseed oil | 25 |
| Cobalt acetate | .05 |
| Calcium carbonate (precipitated chalk) | 50 |

*Example 8*

| | |
|---|---|
| Mineral wax (M. P. 180° F.) | 10 |
| Perilla oil | 30 |
| Blanc fixe (precipitated barium sulphate) | 60 |

*Example 9*

| | |
|---|---|
| Mineral wax (M. P. 200° F.) | 10 |
| Linseed oil | 50 |
| Titanium dioxide | 60 |

*Example 10*

| | |
|---|---|
| Mineral wax (M. P. 170–175° F.) | 10 |
| Linseed oil | 25 |
| Finely divided diatomaceous earth | 10 |
| Titanium dioxide | 1 |

Coloring matter may be added in each case as already described; any other drying oil may be substituted for linseed.

In general, the higher the melting point of the wax, the larger should be the excess of drying oil used.

In preparing the compositions, the wax is heated to above its melting point and mixed with the air-oxidizable film-forming material and then the filler is worked into the mass in any suitable way, as, for example, by hand or machine mixing, by grinding or the like. The resulting liquid compositions may then be cast into forms, for example, in the shape of sticks or pencils, and then allowed to set until they solidify. Alternatively, the mass may be allowed to solidify and then extruded or otherwise formed into desired shapes. In general, the waxy and oleaginous constituents of the compositions may be heated together to produce a liquid mass after which the fillers and any other supplemental ingredients may be incorporated in the manner described.

The waxy materials may be selected from a large group including, for example, paraffin waxes, vegetable and animal waxes such as carnauba wax, beeswax, candelilla, and synthetic waxes such as "Carbowax 4000" and other similar polyethylene glycols of high molecular weight; higher molecular weight carboxylic and fatty acids having a waxy character as, for example, stearic acid, melissic acid, and the like; meltable soaps such as triethanolamine stearate; and hydrogenated animal and vegetable oils such as hydrogenated cottonseed oil, hydrogenated lard oil, hydrogenated corn oil and the like, such oils being hydrogenated to an extent sufficient to bring the melting point up to at least about 140 degrees F. In all cases, the waxy materials utilized, as previously indicated, have a melting point of at least about 140 degrees F. Of particular utility, and especially preferred for my present purposes, are paraffin waxes having melting points within the ranges of about 140 to about 160 degrees F.

Various air-oxidizable film-forming materials may be employed. As previously indicated, such materials comprise aliphatic carboxylic acids containing at least 12, and particularly at least 18, carbon atoms and at least two double bonds and derivatives of such acids. Illustrative examples of such materials are the so-called drying oil and semi-drying oil fatty acids, which may be derived from linseed oil, dehydrated castor oil, soya bean oil, perilla oil, oiticica oil, and tung oil; Neofat #19 acids which comprise essentially unsaturated fatty acids containing 20 to 22 carbon atoms with three or four double bonds and minor proportions of other unsaturated fatty acids. Derivatives of such carboxylic acids are the drying oils and semi-drying oils (hereafter denoted generically as drying oils), such as linseed oil, dehydrated castor oil, tung oil, perilla oil, oiticica oil, certain fish oils, and the like. Such oils are, of course, triglycerides or, in other words, polyhydric alcohol esters, completely esterified, of the drying oil and semi-drying oil fatty acids previously enumerated. In place of the triglycerides, partial esters with other polyhydric alcohols may be utilized as, for example, the monoglycerides and diglycerides of the drying oil and semi-drying oil fatty acids as well as the partial and complete esters of such acids with glycols, polyglycols, polyglycerols, sugar alcohols such as sorbitol, mannitol, sorbitan, mannitan, and the like. Other derivatives of the aforesaid unsaturated fatty acids are the simple alcohol esters thereof as, for example, ethyl linoleate, butyl linoleate, and the like. All of such acids or derivatives thereof are characterized by being oxidized on contact with air to form a dry film or skin.

The fillers are generally of inorganic character and may be selected from a large group, illustrative examples of which are talc, barium sulfate, calcium carbonate, titanium dioxide, zinc oxide, diatomaceous earth, various clay such as bentonite, carbon black, graphite and the like. I prefer to employ fillers which have good covering power and which also have pigment properties, particularly white pigment properties, and I have found that titanium dioxide, as such, or in products as result from its precipitation on calcium sulfate or barium sulfate and in which the titanium dioxide comprises of the order of 25% to 30%, by weight, is especially suitable. If the filler selected does not have the desired color, the color may be supplied by a separate pigment.

In order to obtain satisfactory pipe sealing compounds pursuant to my present invention, I have found, as previously mentioned, that the aforementioned ingredients must be combined in certain ranges of proportions. In general, for each part, by weight, of waxy material there should be at least about one part of the drying oil or the like film-forming material and not less than one part of the filler. Preferably, the drying oil or the like should be in a quantity equal to two to five times that of the wax, or 100 to 400% in excess as indicated in Examples 6–9, and the filler should preferably be present in proportions not substantially less than, and may be equal to or greater than, the total of the waxy material and the drying oil or the like. The proportions are such as to provide a compound or composition which is form-sustaining and soft enough to flow quickly to cover the thread area without having any tendency to crumble. However, as indicated in Example 10, a stick, which is form-sustaining and which will produce a film having sufficient body when spread, may be obtained with a filler in smaller quantities than just mentioned, where the filler is in a finely divided condition.

Supplemental ingredients which may be utilized with advantage are drying accelerators and oxidation retarding agents. The drying accelerators comprise, for example, cobalt acetate, manganese acetate, cobalt hydrate, cobalt naphthenate, or any other cobalt or manganese salt. These drying accelerators need be used in only very small proportions, for example, of the order of 0.1% to about 0.5% by weight, based on the content of the drying oil or the like. The drying accelerator serves to enhance the formation of a film when the sealing compound is not in use, which film, as previously pointed out, acts as a dry, protective surface. In order to enhance the shelf life of the sealing compounds, it is sometimes advantageous to add oxidation retarding agents so that the drying action does not penetrate through the body of the sealing compound. Without the oxidation retarding agents, the shelf life of the sealing compounds made in accordance with my invention is at least several months. This period of time may be enhanced by the addition of small amounts of oxidation retarding agents, for example, from 5% to 20%, by weight, of the drying oil or the like. A suitable oxidation retarding agent is tallow, ordinary beef tallow being preferred.

The word "filler" as used in the claims is intended to include all the various pulverulent materials disclosed herein and their various equivalents which serve as oil absorbent and body-forming substances in the relation herein disclosed. As shown in the examples, such fillers may be used in fairly wide ranges of proportions, the quantity being reduced when the pulverulent material is in finely divided condition. As examples of equivalents of the finely divided diatomaceous earth mentioned in Example 10, I might mention carbon black, finely divided rouge and bentonite, among others.

I claim:

1. A pipe joint sealing compound which is solid at room temperatures and of such consistency that it may be molded into form-sustaining shape suitable as a self-applying implement which will retain rigidity when held in the human hand, comprising a homogeneous mixture of a waxy material having a melting point between about 150–200 degrees F., a drying oil present in a weight of about 100 to 400% in excess of said waxy material, and an inorganic filler in quantity sufficient to impart body to a film produced by the spreading of said compound.

2. A product as defined in claim 1 which is in the form of a stick of convenient size and shape for manual application.

3. A pipe joint sealing compound which is solid at room temperatures and of such consistency that it may be molded into form-sustaining shape suitable as a self-applying implement which will retain rigidity when held in the human hand, comprising a homogeneous mixture of a waxy material having a melting point between about 150–200 degrees F., a drying oil present in a weight of about 100 to 400% in excess of said waxy material, and an inorganic filler in quantity sufficient to impart body to a film produced by the spreading of said compound, said filler being present in a proportion at least approximately equal to the total weight of the waxy material and the drying oil.

4. A product as defined in claim 3 which is in the form of a stick of convenient size and shape for manual application.

5. A product as defined in claim 1 wherein the quantity of the drying oil and the quantity and the character of the filler are so adjusted that the product, when molded in a stick, is stiff and form-retaining and will remain so when subjected to human body heat from the hand for a substantial length of time and will, by oxidation in the air, form a substantial protective skin.

6. A product as defined in claim 1 wherein the drying oil is present in excess of about 150–400% over the waxy material.

7. A product as defined in claim 3 wherein the drying oil is present in excess of about 150–400% over the waxy material.

8. A pipe joint sealing compound as defined in claim 4 in which the waxy material has a melting point between 170° and 200° F.

9. A product as defined in claim 4 wherein the waxy material has a melting point of 180°.

10. A product as defined in claim 4 wherein the waxy material has a melting point of 200°

LESTER ARONBERG.

REFERENCES CITED

The following references are of record in the file of this patent:

FOREIGN PATENTS

| Number | Country | Date |
| --- | --- | --- |
| 13,338 of 1902 | Great Britain | Jan. 29, 1903 |